INVENTOR.
VICTOR W. BOLIE
BY Moody and Baraba
ATTORNEYS

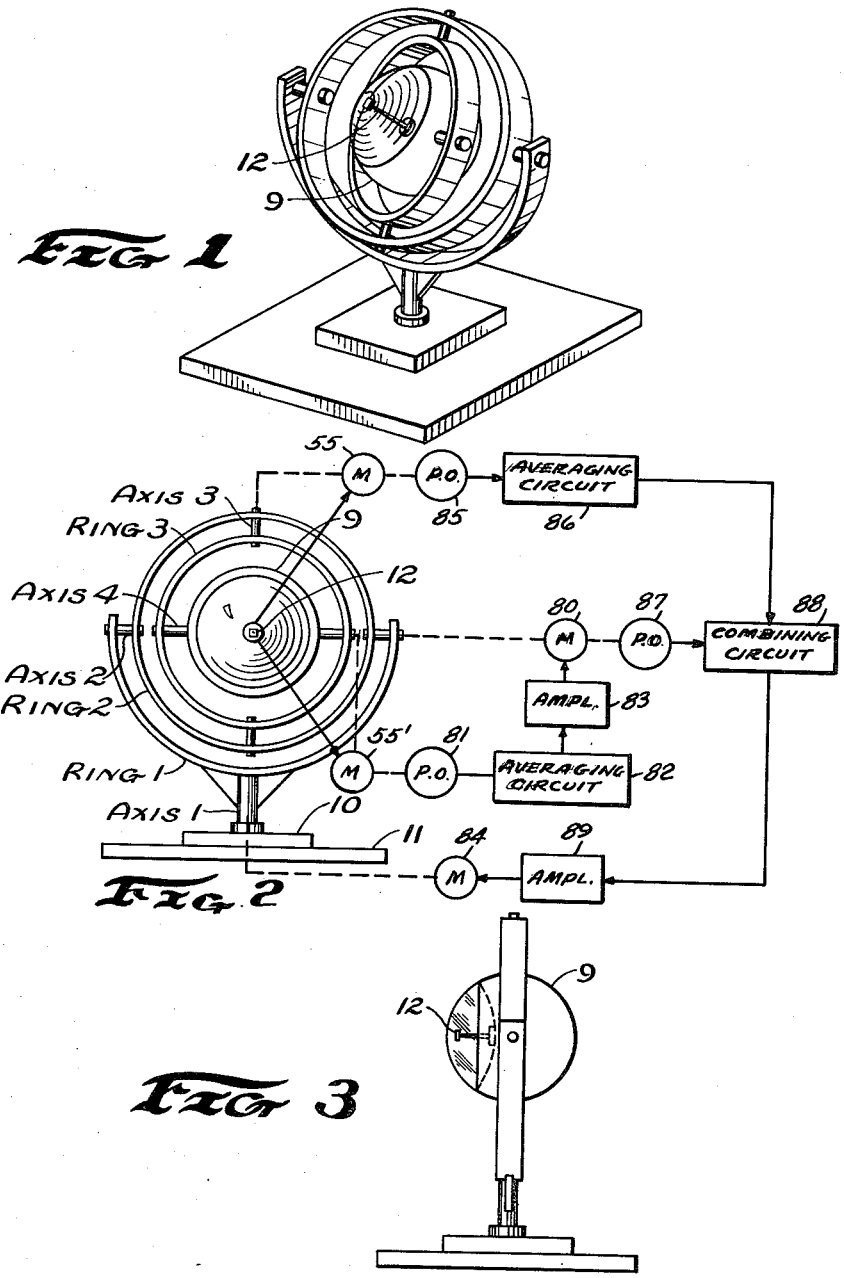
July 31, 1962 — V. W. BOLIE — 3,047,863
RADIOMETRIC NAVIGATION SYSTEM
Filed Sept. 7, 1956 — 4 Sheets-Sheet 1
INVENTOR.
VICTOR W. BOLIE
BY Mosdy and Harsha
ATTORNEYS July 31, 1962  V. W. BOLIE  3,047,863
RADIOMETRIC NAVIGATION SYSTEM
Filed Sept. 7, 1956  4 Sheets-Sheet 3

July 31, 1962 V. W. BOLIE 3,047,863
RADIOMETRIC NAVIGATION SYSTEM
Filed Sept. 7, 1956 4 Sheets-Sheet 4

INVENTOR.
VICTOR W. BOLIE
BY *Marvin Moody*
ATTORNEY

United States Patent Office 3,047,863
Patented July 31, 1962

3,047,863
RADIOMETRIC NAVIGATION SYSTEM
Victor W. Bolie, Cedar Rapids, Iowa, assignor to Collins Radio Company, Cedar Rapids, Iowa, a corporation of Iowa
Filed Sept. 7, 1956, Ser. No. 608,572
6 Claims. (Cl. 343—117)

This invention relates to navigation systems and more particularly to navigation systems employing automatic tracking of celestial bodies.

There have been previous radiometric navigation systems which operated on measuring the microwave radiation from the sun and other celestial bodies. This invention proposes to use the radiation in the two-centimeter-wavelength region since this wavelength region penetrates thick cloud layers and is receivable with highly directive antennas of small size. The prime consideration in developing this invention was to design a microwave tracker of celestial bodies which utilizes the fact that the required information rate from the celestial body is small. This small rate is compensatory for the weak signal received from most radiating bodies. This small information rate occurs because of the slow circling of the earth about the sun and the moon about the earth. The line of sight from the earth to the sun rotates at approximately .986 degree per day with respect to a line fixed in the stars. The moon circles the earth at a rate of 13.2 degrees per day. The angular rate of the sun is just slighlty below the drift rate of presently available rate-integrating gyros. The proximity of these two rates makes the celestial tracking operation well suited to the use of inertial stabilization techniques.

It is a feature of this invention that an all-weather automatic tracker of celestial bodies is provided where the gyro-stabilized microwave radiometer is suspended in a lock-free gimbal mount. Another feature of this invention is that the tracking operation of this navigation system is completely divorced from vehicle motion. It is still another feature of this invention that the tracking operation is completely divorced from navigation geometry and the vertical and north references. It is a still further feature of this invention that the short-term accuracy of the inertial stabilized gyro is combined with the long-term accuracy and stability associated with the microwave radiometer to produce an accurate navigational system. It is a still further feature of this invention that a pendulum vertical reference is used only in the read-out of the altitude and azimuth of the antenna axis.

It is an object of this invention to provide an all-weather navigational system which is extremely accurate. It is a still further object of this invention to provide an all-weather navigation system utilizing a gyro-stabilized microwave radiometer in combination with rate-integrating gyros to produce an accurate navigation system. It is a still further object of this invention to produce a navigation system which considers navigation geometry and yet is not affected by it in its operation. It is another object of this invention to provide a navigational system for use aboard marine vessels which will compensate for the characteristic oscillatory motions of these vessels. It is a still further object of this invention to provide a tracker for celestial bodies having dynamic balance and possessing the ability to track a celestial body through high elevation angles. It is another object of this invention to provide a navigation system having a microwave tracker for celestial bodies incorporating a read-out integrator with special emphasis on an accurate vertical reference. It is another object of this invention to provide a navigation system including a radiometric tracking device where the angular acceleration required for the tracking device is small.

These and other objects of this invention will become more apparent when the following description is read in conjunction with the accompanying drawings, in which FIGURE 1 is an isometric view of the lock-free gimbal-mounted system of this invention;

FIGURE 2 is a front view of the lock-free gimbal-mounted system of this invention;

FIGURE 3 is a side view of the lock-free gimbal-mounted system of this invention;

Figure 4:
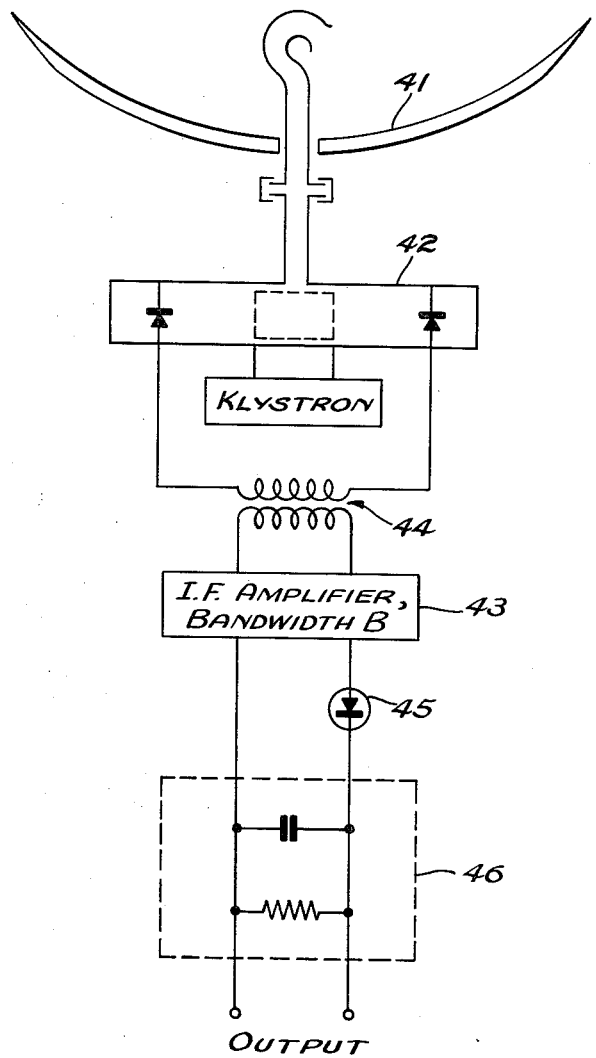
FIGURE 4 is a block diagram of the servo and gyro system of this invention.

In any study of a radiometric navigation system, an understanding of the operation of the sun and moon is of importance. A study of the sun and the moon in connection with the problems of an automatic tracker reveals some significant factors to be considered when constructing a successful tracker. These factors are basically two in number—the first being that in a great proportion of the latitudes where navigation is performed, the celestial bodies appear high in the sky for an appreciable portion of the time. The second factor is that altitude information is normally more useful than azimuth information. The second factor is present because the pendulum is more accurate than the compass as a reference. The pendulum is more accurate than the compass due to the inaccuracy of the north reference, which makes the use of the azimuth accurate to ±60 minutes of arc. Pendulum accuracy at the present time is approximately ±one minute of arc.

The relationship between celestial and geographical coordinate axis is well known in the art and no illustration will be reproduced here. However, there are many accurate illustrations in Dutton, Navigation and Nautical Astronomy, U.S. Naval Institute 1951, chapter 8. As is well known to navigation experts, the vernal equinox is located over the equator and its Greenwich hour angle $\gamma$ from the Greenwich meridian increases uniformly at the rate of 15 degrees per hour of sidereal time due to the earth's rotation. The axis of the earth is tilted from the normal to its orbit by an angle of approximately 23.5 degrees about the line extending to the vernal equinox. The earth orbit-angle changes at the rate of 360 degrees per year due to the motion of the earth in its orbit. As the earth rotates on its axis, the observer's position is carried around a complete parallel of latitude. As a result of these motions, the line of sight to the sun as seen from the observer's position will have an azimuth $\alpha$ and an altitude $\beta$ which vary continuously according to the following well-known equations:

$$\sin \beta = \sin L_s \sin L_p + \cos L_s \cos L_p \cos \gamma \quad (1)$$

$$\sin L_s = \sin L_p \sin \beta + \cos L_p \cos \beta \cos \alpha \quad (2)$$

$$\sin \alpha \cos \beta = \sin \gamma \cos L_s \quad (3)$$

where $L_p$ is the latitude of the observer's position, $L_s$ is the declination of the sun, and $\gamma$ is the local hour angle of the sun.

The above equations when illustrated graphically show that for an observer at the equator the altitude of the sun is over 40 degrees above the horizon more than fifty percent of the time every day of the year.

The first of the above equations is the equation tabulated in navigation tables to establish a line of position from a timed measurement of the altitude $\beta$. Equations 2 and 3 may be used to establish an intersecting line of position from a simultaneously timed measurement of the azimuth $\alpha$. However, Equations 2 and 3 as an independent data source possess no better accuracy than the compass accuracy, which is limited with present equipment to ±60 minutes of arc, as mentioned above. From these observations it is obvious that an error in azimuth produces only a second order error in an altitude-derived line of position. Thus, in navigation the technique of taking accurate altitude measurements corresponding to widely separated azimuth angles has been used extensively. From the above facts, it is obvious that a successful automatic tracker for celestial navigation must incorporate a read-out indicator especially suited to an accurate vertical reference.

An additional consideration for an automatic tracker for marine navigation is that the tracker must utilize a mount which will accommodate the characteristic oscillatory motions of seagoing vessels. These pitching and rolling motions of seagoing vessels have a period of the order of 10 seconds depending upon the ship size, structure, and the particular sea conditions. The roll amplitude and the pitch amplitude will vary over great distances depending upon the amount of sea. The importance of the dynamic balance of the tracker is better understood if acceleration as a force is considered since a ship with a rolling motion of 30 degrees amplitude and 10-second period produces at a point 50 feet above the metacenter an acceleration of 0.32G. From this figure, it is readily apparent that acceleration-induced errors in the pendulum system must either be averaged out or canceled out through the use of angular rate compensations.

This invention is illustrated in one embodiment in FIGURES 1, 2, and 3 as a navigation system having dynamic balance and the ability to track through high elevation angles. The navigation system shown in FIGURES 1, 2, and 3 has the extensions from all four gimbal axes intersecting at a common point. This common point coincides with the center of gravity of the suspended mass of the radiometric receiver. Thus, the radiometric receiver housing is supported in neutral equilibrium. The housing 9 is spherical in shape so as to minimize wind load torques which might otherwise be unsymmetrical and for the further purpose of minimizing gimbal ring diameters. A radiometric receiver such as that shown in FIGURE 4 is encased by the housing 9 of FIGURES 1, 2, and 3 which is supported by the axes 1—4 and the rings 1—3. As a mass suspended in balance, the direction of the antenna axis of this invention will remain nearly fixed with respect to a celestial co-ordinate system except for a small drift effect due to the gimbal rings. With the antenna pointing in approximately the correct direction at all times, the suspended mass of the radiometric receiver and its housing will never require any appreciable angular acceleration. This reduces the power required by the servo motors and their amplifiers.

Referring now to FIGURES 1, 2, and 3, the outer gimbal ring, or ring 1, is formed in the shape of a yoke and rotates about an axis which is always perpendicular to the base 10. The base 10 is rigidly fixed to a deck or other fixed reference plane 11. The second gimbal ring, ring 2, rotates about an axis 2 which is always perpendicular to the axis 1 of the first gimbal ring 1. The third gimbal ring 3 rotates about an axis 3 which is always perpendicular to the axis 2 of the second gimbal ring. The radiometric receiver and housing are supported on an axis 4 which is always perpendicular to the axis 3 of the gimbal ring 3. Only slow rotations about the axes 1 and 2 are permitted. These slow rotations are to actuate the relatively slow changes in the average train and elevation angles of the celestial bodies. Rapid rotations about axes 3 and 4 are permitted by this invention. These rapid rotations are to accommodate the pitch, roll, and yaw motions of the ship. A servo motor is fitted to each of the four axes. These motors may be very small because the torque required is normally not very large. Servo motors adaptable for this purpose are commercially available and will not be described further herein. The servo motors for axes 3 and 4 should be of sufficient size and have such a construction as to produce torques proportional to their excitation signals. These servo motors for the axes 3 and 4 must produce torques independent of the speed of their excitation signals so that pitch, roll, and yaw motions do not supply any torque tending to produce spurious displacements of the antenna axis.

In one embodiment of operation of this invention, the gimbal ring 1 should correspond or be initially trained to the approximate train angle or relative azimuth of the celestial body as defined by time and geographical position. The axis of the second gimbal ring should be initially pointed to the approximate elevation or relative altitude angle of the celestial body. It must be remembered that neither of these two gimbal rings are to be permitted to move very fast with respect to the mounting base 10. There is one exception to this prohibition against moving these two gimbal rings rapidly and that is when the ship is turning. When the ship is turning, the train angle may be directed rapidly and differentially by compass signals in a well-known manner. With the positions of the first and second gimbal rings as described above, the third and fourth axes are not only perpendicular to each other, but are also nearly perpendicular to the line of sight, the line of sight being the line of sight of the antenna to the celestial body. With the constructional requirements described above for this invention there is unlimited mechanical freedom of the antenna up to 90 degrees in any direction.

With reference to FIGURE 2, axis 2 is rotated within gimbal ring 1 by means of a servo motor 80. Servo motor 80 is energized in accordance with signals taken from a pick-off 81 which provides signals indicative of the position of inner axis 4. Pick-off 81 is mechanically positioned in accordance with a servo motor 55′ which serves to position axis 4. The signal from the pick-off 81 is applied to an averaging network 82 wherein the signal is averaged over the time of many cycles of pitch, roll and yaw motions. Axis 2, and thus gimbal ring 2, is thereby always positioned so that the average position of the plane of the third gimbal ring is perpendicular to the antenna axis.

Axis 1 is seen to be positioned by means of a servo motor 84. The input to the servo motor 84 is supplied from a servo amplifier 89 which receives a signal from a combining circuit 88. Combining circuit 88 is supplied with a signal from a pick-off 85 in accordance with the position of axis 3 with said pick-off signal averaged over the time of many cycles of roll and yaw motions in an averaging circuit 86. Additionally, combining circuit 88 is supplied with a correction taken from a secant multiplier or potentiometer indicated as pick-off 87 which is responsive to the position of axis 2. This correction is necessary in order that the gain constant of train servo amplifier 89 be proportional to the secant of the elevation angle to achieve similar servo performance in train and elevation. Thus, the first gimbal ring or outer yoke is always positioned so that the average position of the plane of the second gimbal ring coincides with the average position of the plane of the third gimbal ring. With the above conditions satisfied, the fourth axis is always perpendicular to the antenna axis and the average position of the third axis is perpendicular to the antenna axis. This results in good universal mechanical freedom and action of the system.

With this invention, a primary purpose of the radiometric receiver shown in FIGURE 4 is to sense train and elevation displacements of the antenna axis from the line of sight to the celestial body. The microwave received shown in FIGURE 4 is a simplified embodiment of a typical microwave radiometer. The R.M.S. output fluctuation of a radiometric receiver such as that shown in FIGURE 4 is given by the formula:

$$\Delta T = \frac{\pi}{4}\sqrt{\frac{\pi}{2}} \frac{FT}{\sqrt{B\tau}}$$

where $\Delta T$ = Apparent R.M.S. temperature fluctuation
$T$ = Receiver ambient temperature
$F$ = Receiver noise figure
$B$ = Bandwidth of I.-F. amplifier
$\tau$ = RC time-constant of low-pass filter In FIGURE 4, the antenna assembly 41 is equipped with a nutating feed mechanism so that the antenna is nutated at a predetermined frequency. This antenna is similar to the antenna 12 shown in FIGURES 1, 2, and 3, and is so constructed as to approximately track a point source of microwave noise. In my particular application this point source of microwave noise is a celestial body. The antenna feeds into a local oscillator and balanced mixer 42. The klystron shown in FIGURE 4 is the oscillator, and the mixer may be any of the well-known mixers in the radiometric art. The signal is applied to I.-F. amplifier 43 by transformer means 44. The I.-F. amplifier 43 has a bandwidth designated as B in the above formula. The signal from the I.-F. amplifier 43 passes through the diode detector 45 to the low-pass filter 46. The low-pass filter 46 has a time constant $\tau$ as defined in the formula above. The output signal of the radiometric receiver of FIGURE 4 is an output noise voltage which is amplitude modulated at antenna nutation frequency. The modulation of this voltage is proportional to the antenna-tracking error. Thus, in this invention the apparent R.M.S. temperature fluctuation $\Delta T$ amounts to an equivalent R.M.S. pointing error fluctuation $\Delta \theta$.

The relationship between $\Delta T$ and $\Delta \theta$ is a constant which depends upon the particular antenna used; for example, using a 30-inch parabolic dish designed to operate at 1.91 centimeters wavelength and having a beam width of 1.64 degrees and a scan angle of 42 minutes of arc, the value of the constant for the relationship between $\Delta T$ and $\Delta \theta$ equal 4 degrees Kelvin per minute of arc. The R.M.S. pointing error $\Delta \theta$ is known to be dependent upon the integration time $\tau$ and antenna size. It is known that $\Delta \theta$ is directly proportional to the receiver noise figure and inversely proportional to the square root of the bandwith of the I.-F. amplifier and inversely proportional to the antenna sensitivity factor. It is thus seen that various combinations of values for the receiver noise figure, the antenna sensitivity factor, the I.-F. amplifier bandwidth, and the integration time and antenna value can produce the same value of $\Delta \theta$.

Figure 5:
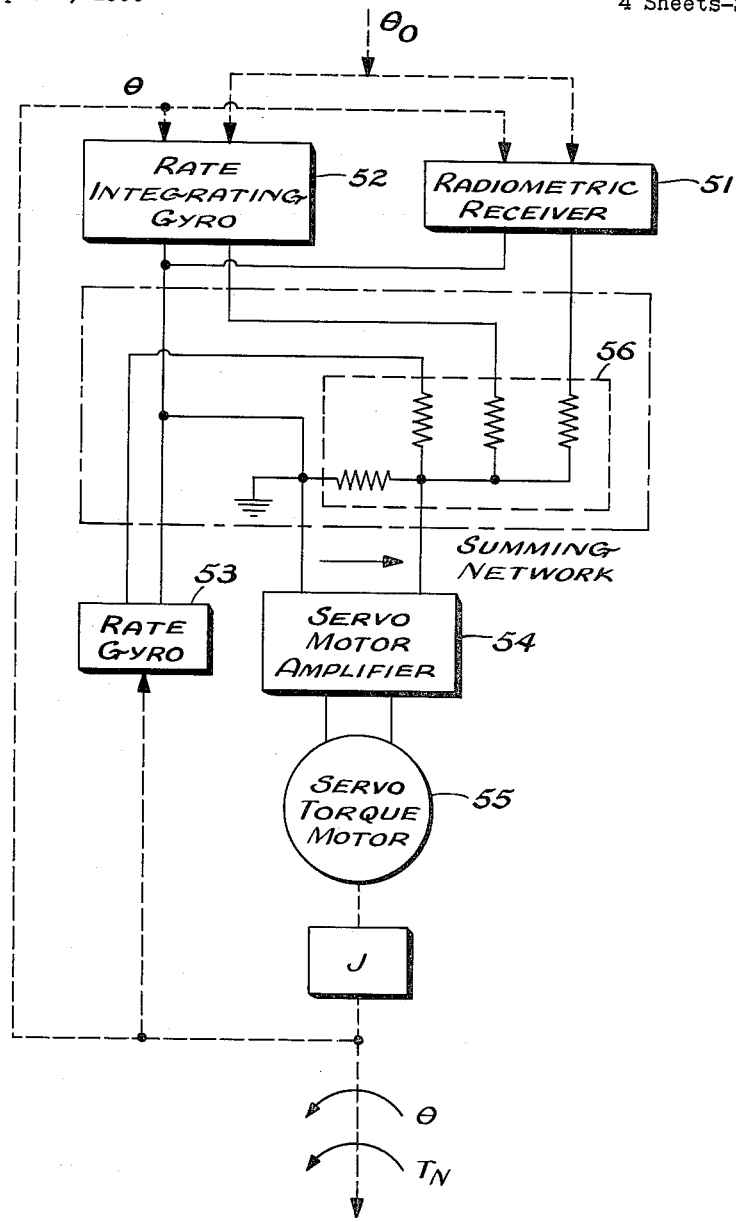
FIGURE 5 is a block diagram of the servo system of this invention.

As previously discussed, gimbal rings 1 and 2 are positioned by means of servo motors in accordance with signals indicative of the positions of axes 3 and 4. Inner gimbal ring 3 and the antenna housing 9 are positioned in accordance with servo motor torquers which receive signals independently of the outer axes 1 and 2. Train and elevation tracking error signals developed in the radiometric receiver located in housing 9 are applied to these servo motors to position the antenna in train and elevation in accordance with the rotation of axes 3 and 4 respectively. The third and fourth servo systems are identical and are located, with the exception of the servo motors per se, within the radiometric receiver. With reference to FIGURE 2, axis 3 is seen to be positioned in accordance with a servo motor 55 which receives an input signal from the radiometric receiver within the housing 9. Axis 4 is positioned in accordance with a servo motor 55' which receives an input signal from the radiometric receiver within housing 9. The servo amplifiers developing signals for servo motors 55 and 55' are indicative of the train and elevation tracking errors respectively. FIGURE 5 illustrates the tracking servo diagram for the positioning of axes 3 and 4 of this invention. The diagram of FIGURE 5 is representative of the tracking system for both the train and elevation axes 3 and 4 of the antenna and, as illustrated, includes servo torque motor 55, which as previously discussed, positions the train axis, axis 3. It is to be realized that the servo tracking scheme for the elevation axis, axis 4, would be identical in makeup. With reference then to FIGURE 5, the housing 9 which mounts the radiometric receiver and the antenna includes a rate gyro 53, a rate integrating gyro 52, the radiometric receiver 51, a servo motor amplifier 54 which develops train tracking error voltage and a summing network generally designated by reference numeral 56. Similar gyros, amplifier and summing networks would be included for the elevation tracking system. The mechanical input $\theta_0$ represents the actual line of sight from the geographical location of the antenna to the celestial body being tracked. The output shaft position is represented as $\theta$, that is the actual position of the antenna axis at any given time with respect to the same reference. The receiver then functions as a differential of sorts, and produces an output signal proportional to the difference between $\theta_0$ and $\theta$. The radiometric receiver 51 thus provides an output signal in accordance with tracking error in both elevation and train at any given instance. Thus, considering the train tracking system, a train tracking error is taken from radiometric receiver 51 and averaged with signals from a rate integrating gyro 52. This composite signal is added to an output from a rate gyro 53. The signals from the rate integrating gyro 52, the radiometric receiver 51 and the rate gyro 53 are combined in a summing network 56. The signal from the summing network 56 is amplified in a servo motor amplifier 54 and fed to the servo torque motor 55 which with reference to FIGURE 2 positions axis 3, the train axis.

Servo torque motor 55 acts against the combined inertia of the suspended mass and driving gear train to rotate the apparatus in train. This act occurs independently for both the train and elevation angles and the basic equation performance applies to both axes of rotation. Thus:

$$J\ddot{\theta} + ag\dot{\theta} + bg\theta = bg\theta_0 + T_N$$

where the dot denotes differentiation with respect to time and where:

$\theta$ equals angular orientation of antenna axis with respect to a reference plane, expressed in radians, $\theta_0$ is the angular orientation of the sun or a celestial body being tracked with respect to the same referenced plane expressed in radians.

$J$ equals total moment of inertia of suspended mass and gear trains expressed in slug-ft.$^2$, where the slug is a mass unit defined as weight divided by the acceleration of gravity (see "Analytical Mechanics for Engineers"—Seely and Ensign, John Wiley & Sons, N.Y.), pages 234 and 433.

$a$ equals rate-gyro scale constant plus viscous damping scale constant, expressed in volts per radian/sec. of angular velocity, $b$ equals radiometric receiver scale constant expressed in volts per radian of angular error.

$g$ equals amplifier-and-motor scale constant, expressed in pound-ft. per volts of input signal, $T_N$ equals noise torque due to bearing friction, windage, etc. expressed in pound-ft. of torque.

The rotating action occurs independently for both the train and elevation angles with the same servo equation applying to both axes of rotation. The amount of damping and sensitivity may be readily adjusted by changing the parameters of the summing network 56. The rate integrating gyro 52 is well-known in the art and senses small angular rotations about any inertial reference axis with a high degree of sensitivity.

The problem of search and inertial locking on to the celestial body is dependent upon the maximum attainable signal-to-noise ratio in the receiver output signal. This in turn depends upon the R.M.S. value of the apparent random temperature fluctuations which, in turn, are dependent upon the receiver integration time-constant. Various modifications may be made to accommodate minimum values of receiver integration time with maximum values for the scan rate.

Figure 6:
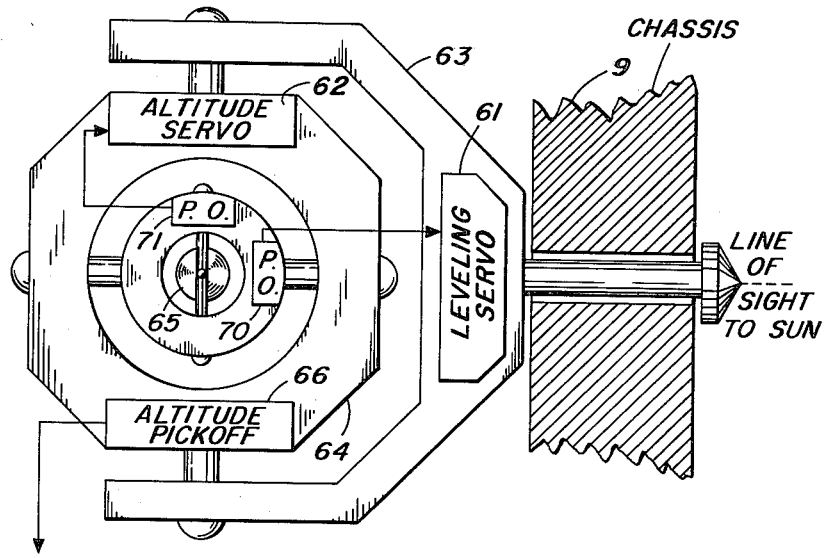
FIGURES 6 and 7 are top and side representations, respectively, of the elevation sensor and pick-off device of this invention.
Figure 7:
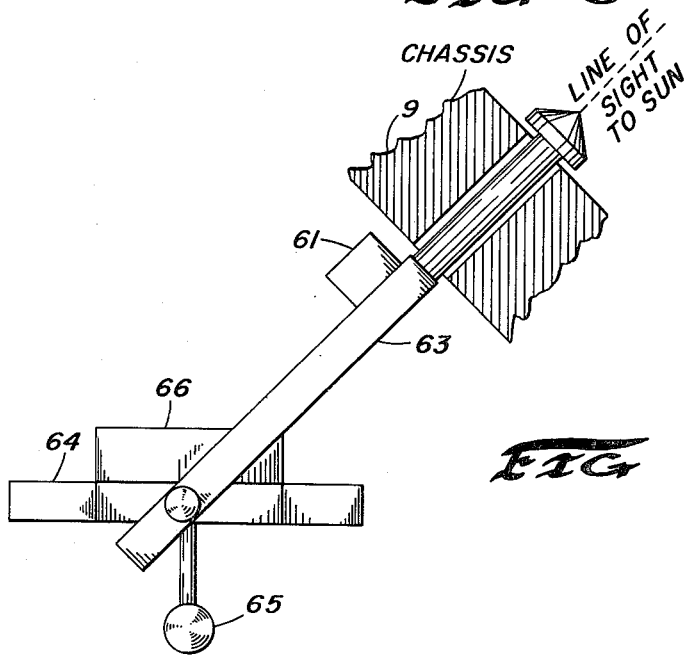

Altitude information indicative of the true elevation of the line-of-sight to the celestial body is supplied from an elevation sensor mounted within the receiver enclosure 9. This elevation sensor is shown in one embodiment in FIGURES 6 and 7. FIGURE 6 is a top view of a functional representation of the elevation sensor and FIGURE 7 is a side view of the same embodiment. As shown in FIGURE 6, the elevation sensor comprises a two-gimbal arrangement; the axis of the outer gimbal 63 coinciding with the line-of-sight to the celestial body, with the axis of the inner gimbal 64 being perpendicular to the line-of-sight. A leveling servo 61 controls the angular position of the axis of outer gimbal 63 and a servo 62 controls the angular position of inner gimbal 64. A vertical reference is associated with inner gimbal 64 and is a standard damped pendulum 65 with orthogonal pick-offs 70 and 71. Thus, a first pick-off 70 which senses deflections of pendulum 65 perpendicular to the line-of-sight controls the leveling servo 61 on the line-of-sight axis. A second pick-off 71 which senses deflections of pendulum 65 perpendicular to the axis of inner gimbal 64 controls the altitude servo 62 on the axis of inner gimbal 64.

Since the line-of-sight is inertially fixed in space, the pitching and rolling motion of the vehicle produces rotation only about the line-of-sight. Translatory motion of the vehicle in three dimensions causes three-dimensional acceleration forces to act on pendulum 65. Since pendulum 65 is damped, it will respond only to forces which are sustained over relatively long periods of time, and the servos 61 and 62 will respond only to signals which are sustained over many cycles of pitch and roll. Thus, even though the instantaneous position of inner gimbal 64 follows rotations of the antenna about the line-of-sight, the average position of inner gimbal 64 is level. Consequently, the signal from altitude pick-off 66 represents the true elevation of the line-of-sight. High accuracy in altitude information by use of this device is assured if the pendulum 65 and the leveling servo 61 maintain the average position of the axis of the pendulum within ±one degree of its correct position. This elevation sensor is designed primarily to obtain a high degree of accuracy in navigation. This elevation sensor provides a device which is not dependent upon the horizon as a reference. This elevation sensor makes use of the fact that with this navigation system the reference frame for the pendulum is inertially fixed in space so that a simple averaging of the pendulum oscillations may be accomplished without the use of stabilizing gyros. The accuracy limitation of this altitude sensor resides strictly in the read-out accuracy of the pendulum pick-off 71. Any rate lags associated therewith are easily and fully predictable and can be compensated for quite easily.

Although this invention has been described with respect to particular embodiments thereof, it is not to be so limited as changes and modifications may be made therein which are within the full intended scope of the invention as defined by the appended claims.

What is claimed is:

1. A stable radiometric sextant comprising a base having essentially a flat surface, said base affixed to a surface of a vehicle where said vehicle is free to move in at least three axes, a first axis rigidly fixed to said base at right angles to the plane of said base, a first gimbal ring attached to said first axis and supported by said first axis, said first gimbal ring comprising a portion of a ring, a second axis at right angles to said first axis, said second axis including two rigid cylindrical members supported at one end by said gimbal ring with said support points being separated by 180 degrees on said gimbal ring, a second gimbal ring, said second gimbal ring supported by the other end of each of said second axis members at points 180 degrees apart on said second ring, a third axis, said third axis including two rigid cylindrical members each supported at one end by said second gimbal ring at points 180 degrees apart on said second ring, a third gimbal ring supported by the other end of each of said third axis members, a fourth axis, said fourth axis at right angles to said third axis and including two rigid cylindrical members each supported at one end by said third gimbal ring at points 180 degrees apart on said third ring, a spherical housing supported by the other ends of said members of said fourth axis, each of said gimbal rings and said housing being free to rotate about its supporting axis whereby said gimbal rings form a stable platform with the mass in said spherical housing being suspended in dynamic balance, a plurality of servo motors, one of said servo motors fitted to each individual axis to individually control the action of the associated gimbal ring, first and second ones of said servo motors fitted to axes one and two respectively and permitting only slow rotation of the associated gimbal rings, third and fourth ones of said servo motors fitted to axes three and four respectively and permitting rapid motion of the associated gimbal ring and housing with such motions being independent of the motion of the vehicle, means for deriving signals indicative of the average angular position of said third and fourth axes with respect to said second and third gimbal rings respectively, said first and second servo motors positioned in accordance with said third and fourth axes position indicative signals respectively, a radiometric receiver including an antenna, a local oscillator and a balanced mixer, said antenna being initially pointed at a radiating celestial body by an initial positioning of said first and second servo motors and means including the radiometric receiver and said third and fourth servo motors for generating and applying correction signals to said third and fourth axes whereby said antenna is continuously and accurately pointed at the desired celestial body.

2. A stable radiometric sextant comprising a base having essentially a flat surface, said base affixed to a surface of a vehicle where said vehicle is free to move in at least three axes, a first axis rigidly fixed to said base at right angles to the plane of said base, a first gimbal ring attached to said first axis and supported by said first axis, said first gimbal ring comprising a portion of a ring, a second axis at right angles to said first axis, said second axis including two rigid cylindrical members supported at one end by said gimbal ring with said support points being separated by 180 degrees on said gimbal ring, a second gimbal ring, said second gimbal ring supported by the other end of each of said second axis members at points 180 degrees apart on said second ring, a third axis, said third axis including two rigid cylindrical members each supported at one end by said second ring at points 180 degrees apart on said second ring, a third gimbal ring supported by the other end of each of said third axis members, a fourth axis, said fourth axis at right angles to said third axis and including two rigid cylindrical members each supported at one end by said third gimbal ring at points 180 degrees apart on said third ring, a spherical housing supported by the other ends of said members of said fourth axis, each of said gimbal rings being free to rotate about its supporting axis whereby said gimbal rings form a stable platform with the mass in said spherical housing being suspended in dynamic balance, a plurality of servo motors, one of said servo motors fitted to each individual axis to individually control the action of the associated gimbal ring, first and second ones of said servo motors fitted to axes one and two and permitting only slow rotation of the associated gimbal rings, third and fourth ones of said servo motors fitted to axes three and four and permitting rapid motion of the associated gimbal ring and housing with such motions being independent of the motion of the vehicle, first signal deriving means for positioning said first servo motor in accordance with the average angular position of said third and fourth axes, second signal deriving means for positioning said second servo motor in accordance with the average angular position of said fourth axis whereby said third and fourth axes are maintained perpendicular to the line of sight to a predetermined celestial body, a radiometric receiver including an antenna, a local oscillator and a balanced mixer, said antenna being pointed at a radiating celestial body by an initial positioning of said first and second servo motors and means including the radiometric receiver and said third and fourth servo motors for generating and applying correction signals to said third and fourth axes whereby said antenna is continuously and accurately pointed at the desired celestial body.

3. A stable radiometric sextant comprising a base having essentially a flat surface, said base affixed to a surface of a vehicle where said vehicle is free to move in at least three axes, a first axis rigidily fixed to said base at right angles to the plane of said base, a first gimbal ring attached to said first axis and supported by said first axis, said first gimbal ring comprising a portion of a ring, a second axis at right angles to said first axis, said second axis including two rigid cylindrical members supported at one end by said gimbal ring with said support points being separated by 180 degrees on said gimbal ring, a second gimbal ring, said second gimbal ring supported by the other end of each of said second axis members at points 180 degrees apart on said second ring, a third axis, said third axis including two rigid cylindrical members each supported at one end by said second ring at points 180 degrees apart on said second ring, a third gimbal ring supported by the other end of each of said third axis members, a fourth axis, said fourth axis at right angles to said third axis and including two rigid cylindrical members each supported at one end by said third gimbal ring at points 180 degrees apart on said third ring, a spherical housing supported by the other ends of said members of said fourth axis, each of said gimbal rings being free to rotate about its supporting axis whereby said gimbal rings form a stable platform with the mass in said spherical housing being suspended in dynamic balance, a plurality of servo motors, one of said servo motors fitted to each individual axis to individually control the action of the associated gimbal ring and housing, first and second ones of said servo motors fitted to axes one and two and permitting only slow rotation of the associated gimbal rings, third and fourth ones of said servo motors fitted to axes three and four and permitting rapid motion of the associated gimbal ring and housing with such motions being independent of the motion of the vehicle, first signal deriving means for positioning said first servo motor in accordance with the average angular position of said third and fourth axes, second signal deriving means for positioning said second servo motor in accordance with the average angular position of said fourth axis whereby said third and fourth axes are maintained perpendicular to the line of sight to a predetermined celestial body, a radiometric receiver including an antenna, a local oscillator and a balanced mixer, said antenna being pointed at a radiating celestial body by an initial positioning of said first and second servo motors and means including the radiometric receiver and said third and fourth servo motors for generating and applying correction signals to said third and fourth axes whereby said antenna is continuously and accurately pointed at the desired celestial body, elevation sensing means carried within said spherical housing and including means for determining the elevation of the line-of-sight to said celestial body, said last means comprising a pendulum and pick-off means whereby the pendulum deflections definitive of the line-of-sight to said celestial body are determined.

4. A stable radiometric sextant comprising a base having essentially a flat surface, said base affixed to a surface of a vehicle where said vehicle is free to move in at least three axes, a first axis rigidly fixed to said base at right angles to the plane of said base, a first gimbal ring attached to said first axis and supported by said first axis, said first gimbal ring comprising a portion of a ring, a second axis at right angles to said first axis, said second axis including two rigid cylindrical members supported at one end by said gimbal ring with said support points being separated by 180 degrees on said gimbal ring, a second gimbal ring, said second gimbal ring supported by the other end of each of said second axis members at points 180 degrees apart on said second ring, a third axis, said third axis including two rigid cylindrical members each supported at one end by said second ring at points 180 degrees apart on said second ring, a third gimbal ring supported by the other end of each of said third axis members, a fourth axis, said fourth axis at right angles to said third axis and including two rigid cylindrical members each supported at one end by said third gimbal ring at points 180 degrees apart on said third ring, a spherical housing supported by the other ends of said members of said fourth axis, each of said gimbal rings and housing being free to rotate about its supporting axis whereby said gimbal rings form a stable platform with the mass in said spherical housing being suspended in dynamic balance, a plurality of servo motors, one of said servo motors fitted to each individual axis to individually control the action of the associated gimbal ring, said servo motors fitted to axes one and two permitting only slow rotation of the associated gimbal rings, said servo motors fitted to axes three and four permitting rapid motion of the associated gimbal ring and housing with such motions being independent of the motion of the vehicle, first signal deriving means for positioning said first servo motor in accordance with the average angular position of said third and fourth axes, second signal deriving means for positioning said second servo motor in accordance with the average angular position of said fourth axis whereby said third and fourth axes are maintained perpendicular to the line of sight to a predetermined celestial body, a radiometric receiver including an antenna, a local oscillator and a balanced mixer, said antenna being pointed at a radiating celestial body by an initial positioning of said first and second servo motors and means including the radiometric receiver and said third and fourth servo motors for generating and applying correction signals to said third and fourth axes whereby said antenna is continuously and accurately pointed at the desired celestial body, elevation sensing means for measuring the elevation of said antenna comprising within said sperical housing a damped pendulum, fourth and fifth gimbal rings, said fourth gimbal ring rotatable about an axis coinciding with the line-of-sight axis to said celestial body, said fifth gimbal ring being rotatable with respect to said fourth gimbal ring about an axis perpendicular to the line-of-sight to said celestial body, said pendulum carried by said fifth gimbal ring and adapted for deflection perpendicular to the axes of each of said fourth and fifth gimbal rings, first and second pendulum pick-off sensing means adapted to develop signals indicative of said pendulum deflections about said line-of-sight and fifth gimbal ring axes respectively, means for servo positioning said fourth gimbal ring in response to the average output from said first pendulum pick-off means and means for servo positioning said fifth gimbal ring in response to the average output from said second pendulum pick-off means, and output pick-off means developing a signal proportional to the relative rotation between said fourth and fifth gimbal rings.

5. A stable radiometric sextant comprising a base having essentially a flat surface, said base affixed to a surface of a vehicle with said vehicle having freedom of movement in at least three axes, a stable platform including a first axis, a second axis, a third axis, and a fourth axis, with said second axis at right angles to said first axis, and with said third axis at right angles to said fourth axis, each of three of said axes individually supporting a gimbal ring, a spherical housing, said spherical housing supported by said fourth axis similar to each of said gimbal rings, a radiometric receiver including an antenna located in said spherical housing, said stable platform suspending the mass of said radiometric receiver in said spherical housing in dynamic balance, a servo motor fitted to each of said axes with first and second ones of said servo motors positioning said first and second axes in response to signals derived independent of the motion of said vehicle and being indicative of the angular position of said third and fourth axes respectively, such that the average position of the plane of the gimbal ring supported by said third axis is perpendicular to said antenna axis and the average position of the plane of the gimbal ring supported by said second axis coincides with the average position of the plane of the gimbal ring supported by said third axis, said antenna being pointed at a radiation source by an initial positioning of said first and second servo motors, and third and fourth ones of said servo motors responsive to signals from said radiometric receiver and positioning said third and fourth axes to position said antenna to correspond to the line of sight of said radiation source.

6. An altitude information generating system comprising an antenna, means for positioning the axis of said antenna coincident with the line-of-sight to a source of radiant energy, said antenna being rotatable about said line-of-sight axis; an elevation sensing means comprising a first gimbal affixed to said antenna for rotation about an axis coincident with that of said line-of-sight, a second gimbal rotatably fixed with respect to said first gimbal and having an axis of rotation perpendicular to said line-of-sight axis, a damped pendulum carried by said second gimbal ring and adapted for deflections perpendicular to the axis of said first ring and for deflections perpendicular to the axis of said second ring, first and second servo positioning means operably connected to effect rotation of said first and second gimbals about their respective axes, first and second deflection pick-off means associated with said pendulum for determining pendulum deflections with respect to the axes of said first and second gimbals respectively, said first and second pendulum pick-off means connected to and activating said first and second servo positioning means respectively, and further pick-off means associated with the first and second gimbals to determine relative rotation therebetween whereby said relative rotation is indicative of the true elevation of said line-of-sight to said source of radiant energy.

References Cited in the file of this patent

UNITED STATES PATENTS

| | | |
|---|---|---|
| 2,048,834 | Young | July 28, 1936 |
| 2,666,199 | Rothschild | Jan. 12, 1954 |
| 2,715,776 | Knowles | Aug. 23, 1955 |
| 2,740,962 | Hammond | Apr. 3, 1956 |
| 2,762,123 | Schultz et al. | Sept. 11, 1956 |
| 2,836,894 | Wagner | June 3, 1958 |